United States Patent
Medellín Rivera et al.

(10) Patent No.: US 10,974,229 B2
(45) Date of Patent: Apr. 13, 2021

(54) PROCEDURE TO PREPARE A SUPPORTED TRIMETALLIC CATALYST FOR PRODUCTION OF ULTRA LOW SULFUR DIESEL AND ITS APPLICATION

(71) Applicants: Blanca Lucia Medellín Rivera, Mexico City (MX); Gonzolo Hernández Tapia, Mexico City (MX); Maria del Rosario Socorro Luna Ramírez, Mexico City (MX); Leonardo Díaz García, Mexico City (MX); Maria Teresa Gómez Pérez, Mexico City (MX); Roberto Garcia De León, Mexico City (MX)

(72) Inventors: Blanca Lucia Medellín Rivera, Mexico City (MX); Gonzolo Hernández Tapia, Mexico City (MX); Maria del Rosario Socorro Luna Ramírez, Mexico City (MX); Leonardo Díaz García, Mexico City (MX); Maria Teresa Gómez Pérez, Mexico City (MX); Roberto Garcia De León, Mexico City (MX)

(73) Assignee: INSTITUTO MEXICANO DEL PETRÓLEO, Mexico City (MX)

(*) Notice: Subject to any disclaimer, the term of this patent is extended or adjusted under 35 U.S.C. 154(b) by 17 days.

(21) Appl. No.: 16/158,712

(22) Filed: Oct. 12, 2018

(65) Prior Publication Data
US 2019/0126254 A1    May 2, 2019

(30) Foreign Application Priority Data
Oct. 12, 2017    (MX) .................... MX/a/2017/013114

(51) Int. Cl.
*B01J 23/888* (2006.01)
*B01J 37/02* (2006.01)
(Continued)

(52) U.S. Cl.
CPC .......... *B01J 23/8885* (2013.01); *B01J 21/04* (2013.01); *B01J 37/0207* (2013.01);
(Continued)

(58) Field of Classification Search
CPC .... B01J 23/8885; B01J 21/04; B01J 37/0207; B01J 37/0209; B01J 37/0213; B01J 37/20;
(Continued)

(56) References Cited

U.S. PATENT DOCUMENTS

| 6,540,908 | B1* | 4/2003 | Eijsbouts | B01J 31/0215 208/213 |
| 2002/0013223 | A1* | 1/2002 | Eijsbouts | B01J 23/85 502/216 |
| 2015/0209766 | A1* | 7/2015 | Xavier | B01J 21/04 502/220 |

* cited by examiner

*Primary Examiner* — Patricia L. Hailey
(74) *Attorney, Agent, or Firm* — FisherBroyles LLP; Kevin D. Jablonski

(57) ABSTRACT

According to this invention, a Ni—Mo—W trimetallic catalyst supported on porous alumina is obtained that shows very high activity for hydrotreating (HDT) of gasoils, particularly deep hydrodesulfurization (HDS) and hydrodesnitrogenation (HDN) of straight run gasoil in conditions of moderate pressure.

When the catalyst is applied to HDT of diesel, the NiMoW catalyst exhibits high catalytic activity. The content of sulfur and nitrogen in the resulting diesel can be reduced from 13,200 to 10 ppm and nitrogen from 360 ppm to less than 1 ppm, under moderate pressure, temperature and space-velocity (LHSV) similar to those of an industrial unit.

(Continued)

The catalytic composition, of trimetallic type, is prepared from an alumina support of high surface area to which a solution containing a metal precursor of an element of group VIB is added, followed by other solution that contains one of the precursors of the active metallic phase, a solution containing another of the precursors of the active metallic phase from group VIB, a metal promoter of group VIII and an additive promoter of acidity from group VB, and finally another solution containing a metal of group VIB, a metal of Group VIII and an organic compound, the used route promotes the preferential formation of well dispersed structures of the used metals on the support of porous alumina, less refractory to sulfidation, with high stacking and short lengths of metal sulfides formed in the resulting hydrodesulfurization catalyst. In the formulation, at least a percentage, but not all the Mo is replaced by W, in a Mo/W molar ratio of 0.6 to 2.0.

14 Claims, 8 Drawing Sheets

(51) Int. Cl.
  *B01J 37/20* (2006.01)
  *C10G 45/08* (2006.01)
  *C10G 45/72* (2006.01)
  *B01J 21/04* (2006.01)

(52) U.S. Cl.
  CPC ....... *B01J 37/0209* (2013.01); *B01J 37/0213* (2013.01); *B01J 37/20* (2013.01); *C10G 45/08* (2013.01); *C10G 45/72* (2013.01); *B01J 2523/51* (2013.01); *B01J 2523/68* (2013.01); *B01J 2523/69* (2013.01); *B01J 2523/847* (2013.01); *C10G 2300/1059* (2013.01); *C10G 2300/202* (2013.01); *C10G 2300/207* (2013.01); *C10G 2400/04* (2013.01)

(58) Field of Classification Search
  CPC ................ B01J 2523/51; B01J 2523/68; B01J 2523/69; C10G 45/08; C10G 45/72; C10G 2300/1059; C10G 2300/202; C10G 2300/207; C10G 2400/04
  USPC .................................. 502/211, 213, 314, 315
  See application file for complete search history.

PROCEDURE TO PREPARE A SUPPORTED TRIMETALLIC CATALYST FOR PRODUCTION OF ULTRA LOW SULFUR DIESEL AND ITS APPLICATION

TECHNICAL FIELD OF THE INVENTION

The present invention is related to the procedure for the preparation of a trimetallic catalyst formulated with molybdenum-tungsten-nickel, and phosphorus as an additive, supported on alumina. The catalyst of this invention is used to obtain ultra-low-sulfur diesel (less than 10 ppm) from straight run gasoil and mixtures of straight run gasoil with light cyclic oil. The particularity of this prototype is that when activating the metallic sites, NiMoWS type II species are obtained.

The aim of the present invention is also to provide a catalyst for hydrotreating (hydrogenation, hydrodesulfurization and hydrodesnitrogenation), with a performance equal to or higher than that reported in the state of the art, as catalysts for hydrotreating of hydrocarbons, under hydrotreating process schemes that employ such catalyst. The catalyst comprises 15 to 25% by weight of at least two metals of group VIB in its oxide phases, 3 to 6% by weight of at least one element of group VIII in its oxide phase, a Phosphorus content of 0.1 to 1.0% weight and from 0.10 to 0.70 times the amount of an organic additive related to the total number of moles of the elements of group VIB+VIII, integrated into an inorganic porous support, composed mainly of alumina or silica-alumina.

BACKGROUND OF THE INVENTION

Every time environmental regulations require fuels with lower levels of sulfur (15 ppm maximum in Mexico) and nitrogen; moreover, the crude oils that are processed, possess increasingly higher contents of the said contaminating heteroatoms. Consequently, there is a need to increase the activity and efficiency of the catalysts for hydrodesulfurization (HDS), hydrodesnitrogenation (HDN) and hydrogenation to generate clean fuels.

Thus, the development of active catalysts for deep HDS of diesel fuel is a challenge and a global necessity, in order to reach the levels of ultra low sulfur content in diesel.

Commonly, industrial HDS catalysts have a similar composition, in which a metal of Group VIII such as Ni or Co acts as a promoter and a metal of Group VIB such as Mo or W acts as an active component in the catalyst. The catalysts are supported on an amorphous porous or low crystallinity alumina, a silicoaluminate or silica-alumina. Some additives such as phosphorus, fluorine or boron can be integrated to improve catalytic performance.

When the Molybdenum is partially supplemented by Tungsten, an amorphous phase is produced, which after being sulfided generates a catalyst of very high activity for hydrodesulfurization (HDS), hydrodesnitrogenation (HDN) and hydrogenation in comparison with a Nickel-Molybdenum catalyst without Tungsten.

These catalysts can be prepared by successive impregnation of the metals on the porous support, with acidic or alkaline aqueous solutions containing said metal components, drying and calcination. They can also be prepared by co precipitating the support together with the metal components of group VIII and group VIB. Usually, for a process where desulfurization is the main reaction, the preferred combination is Co (Ni)—Mo, while if hydrogenation is the main reaction, such as saturation of aromatics, the preferred combination is Ni—W.

The present invention relates to a catalyst composed of Molybdenum-Tungsten-Nickel with Phosphorus as additive, supported on porous alumina to obtain ultra-low sulfur diesel from straight run gasoil and mixtures of straight run gasoil and light cyclic oil.

The present invention also relates to a procedure for the preparation of a catalyst Mo—W—Ni, with high activity for hydrodesulfurization (HDS), hydrodesnitrogenation (HDN) and deep hydrogenation of straight run gasoil. The straight run gasoil is characterized by the sulfur content of 13,000 to 14,000 ppm by weight and by the total nitrogen content of 360 ppm by weight. The light cyclic oil is characterized by the sulfur content of 13,800 ppm by weight and by the total nitrogen content of 412 ppm by weight. With the use of the catalyst of the present invention, diesel with less than 10 ppm sulfur can be obtained at moderate pressure, temperature and LHSV operating conditions of an industrial hydrotreating unit.

With regard to the foregoing, the following references found within the state of the art, relating to trimetallic catalysts that could be similar to the one of this invention, are provided; however, the analysis of those reveals important differences regarding the preparation procedure, physical form, metallic composition, content of additives and catalytic activity of the catalyst of this invention in the hydrotreatment of fossil fuels.

The patent US20150224481 refers to a catalyst that contains a mixture of metal oxides, among them nickel, molybdenum and tungsten and other metals such as Al, K, Ti and Zn. It is of a very high metallic content: from 70 to 90% of metal oxides and from 10 to 30% of $SiO_2$—$Al_2O_3$ and is used for the selective hydrogenation of olefins. It is used to treat FCC gasoline, pyrolysis gasoline and other charges with a high olefin content. The method for preparing the catalyst is carried out by means of an alkaline slurry of the metals salts of the formulation, with an ion exchange step. The solid obtained from that slurry is filtered, washed and calcined before being mixed with a binder of $SiO_2$—$Al_2O_3$. Subsequently, it is extruded and calcined again. Before the activity tests in fixed bed reactor, it is activated in-situ.

The patent US 2014/0323779 A1 refers to a procedure for preparing a NiW or NiWMo catalyst supported on a porous alumina or silica-alumina material, starting from a tungsten mononuclear precursor in its monomeric or dimeric form, having at least one function W=O or W—OR or a function W=S or W—SR with many variants of the radical R and a metal precursor of group VIII, preferably Ni. If the catalyst is used in HDS, it must have a precursor of Molybdenum. The catalysts protected in this patent are prepared in a strictly water-free environment, using as tungsten precursors: (oxo) tungsten ethoxide, $W(=O)(OC_2H_5)_4$ diluted in dichloromethane; hexa tungsten ethoxide, $W(OC_2H_5)_6$, diluted in dichloromethane; penta tungsten ethoxide, $W(OC_2H_5)_5$, diluted in cyclohexane, etc. And as a precursor of molybdenum, $Mo(OEt)_5$ is used among others. The metals can be added to the support simultaneously or successively. The catalyst is used after being sulfided and is used in hydrogenation reactions, particularly in hydrotreating and hydrodisintegration reactions. Among several applications, it can be used to obtain ultra-low sulfur diesel.

The method of preparation does not interfere with the procedure of preparation of the NiMoWP catalyst described in this invention.

The patent CA 283 22 47 A1 refers to the process of Hydrodisintegration with the gasoline approach through a Hydrodisintegration or hydrodesulfurization catalyst containing metals with activity. in HDS. They refer to the hydrodisintegration of feedstocks from mineral origin, from vegetable origin, animal, from fish, from pyrolysis and mixtures thereof, it is mentioned that it is convenient to add some sulfur to the feeds of biological origin, in order to keep sulfided the HDS catalyst. The process is carried out in three reactors, where the first one has the most severe conditions. Ample details of the configuration of the reaction system are mentioned. The catalyst used contains sulfided NiMoW. The reactors can use the same catalyst. The support of the catalyst is of acid type. They protect the use of ZSM-48 and ZSM-23 for the second reactor. It is mentioned that a dewaxing catalyst is used in the second reactor using same zeolites and at least one hydrogenating metal such as Pt, Pd or Ni or NiMoW.

It is not mentioned if the catalyst is supported or in bulk; however, it is mentioned that the combination of Ni, Mo and W can provide good desulfurization activity and that this activity can be increased as the molar ratio of molybdenum to tungsten approaches 1:1.

This patent does not mention the NiMoW catalyst preparation procedure and does not contain phosphorus. The diesel mentioned is not a process feedstock, but a hydrocracking by-product, with a sulfur content higher than any specification.

Patent US20090139898 describes the preparation of two catalysts for hydrogenation, which in specific terms means hydrotreating. The firsts catalyst is supported on gamma-alumina or silica-alumina and the second one has a support of gamma-alumina and a zeolite, or molecular mesh, particularly Y-zeolite, beta-zeolite or SAPO-11. Both catalysts are formulated with Ni+Mo+W+P with adjuvant compounds or additives such as phosphorus, fluorine and phosphorus plus fluorine. Fluoride is always added to the support with drying and calcination stage. Phosphorus is added with active metals. The first catalyst Ni+Mo+W, with and without P, supported on gamma-alumina or silica-alumina, is prepared by co-w impregnating all metals, or by first impregnating the Mo with drying at 120° or 200° C. and calcination at different temperatures (250, 300, 400, 430 or 450° C.) and then the Ni+W+P solution is impregnated, with or without calcination; some prototypes are impregnated with citric acid and ethylene glycol on the active metals and no longer calcined. The second catalyst is different because the support contains a zeolite of the aforementioned lines and may or may not have fluorine in the support. The active metals and the P are impregnated under the same criteria of preparation from catalyst one and EDTA is added to the set of organic agents of study. In these catalysts, EDTA is also added after the active metals and is not calcined. The content of metallic oxides in both catalysts is as follows: 1-7% by weight of Ni, 15-45% of Mo+W, 0.4-4% by weight of phosphorus, 1-10% of fluorine and of 0.3-3.5% w of phosphorus+1-10% w of fluorine when both are added to the catalyst. The zeolite content in the second catalyst is 1-55% by weight on the support. The catalysts are used in hydrotreating at the following process conditions: T=220-400° C.; P=2-15 MPa, LHSV=0.3-5 h$^{-1}$ and rel. H$_2$/Hc=50-4000; the feedstocks to which they are applied are: crude oils, petroleum distillates, oils refined with solvent; deasphalted light oils and deasphalted heavy oils.

The composition and manner of preparation of the catalysts do not interfere with the catalysts of this invention.

BRIEF DESCRIPTION OF THE FIGURES OF THE INVENTION

FIG. 1. Shows the temperature-programmed reduction profile (H$_2$-TPR) made to the catalyst of this invention, without calcining and without sulfiding.

FIG. 2. Shows the X-ray diffractogram of the NiMoW catalyst of the present invention, dried, without calcining and without sulfiding.

FIG. 3. Shows the XPS spectrum of the sulfided tungsten phase in the NiMoW catalyst of this invention.

FIG. 4. Shows the XPS spectrum of the sulfided molybdenum phase in the NiMoW catalyst of this invention.

FIG. 5. Shows a micrograph obtained by high-resolution microscopy (HRTEM) of a tungsten catalyst after being sulfided. It is not a catalyst for the scope of this patent. It is a comparative catalyst for the scope of this characterization technique.

FIG. 6. Shows a micrograph obtained by high-resolution microscopy (HRTEM) of the catalyst of the present invention, after being sulfided, where the "slabs" of NiMoS and/or NiMoWS are observed.

DETAILED DESCRIPTION OF THE INVENTION

Figure 1:
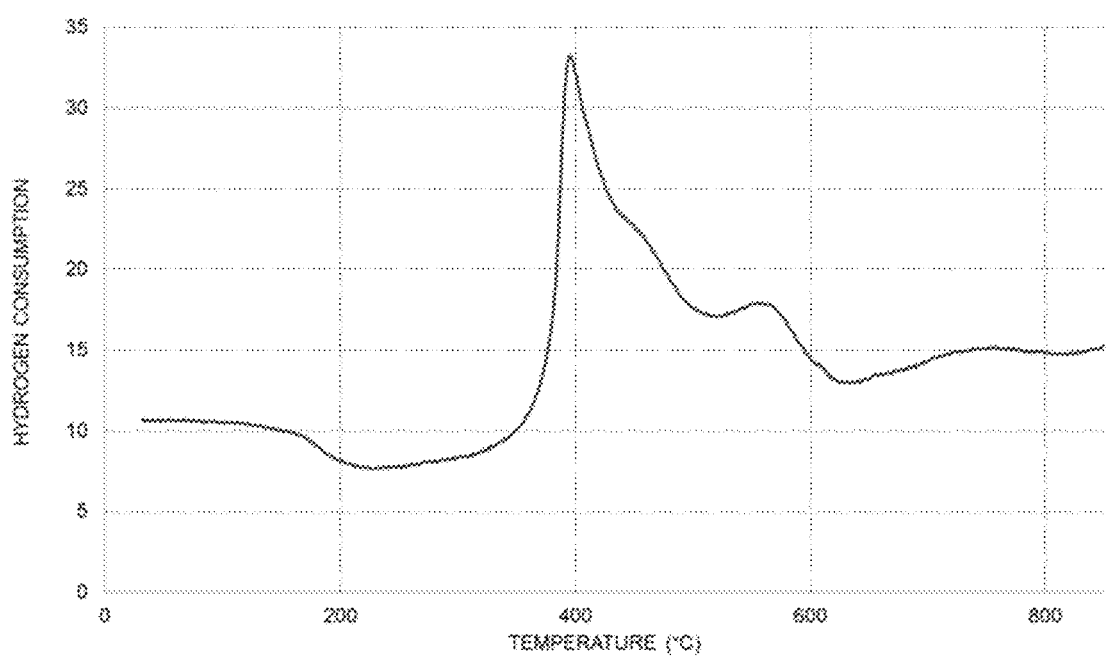

The preparation procedure described in the present invention is useful for obtaining a catalyst for the hydrodesulfurization of petroleum middle fractions. The catalyst object of this invention is a trimetallic catalyst (NiMoW), which comprises a support material of alumina type with incorporation of two active metals, at least one promoter element, an additive that can be phosphorus and at least one organic compound, which together confer physical and chemical properties to adequately carry out the hydrodesulfurization reactions.

With the catalyst preparation procedure of the present invention, a good dispersion of the hydrogenating-hydrodesnitrogenating phase is ensured by adding simultaneously, or successively, preferably successively, a metal of group VIB, a metal of group VIB in combination with a metal of group VIII and an additive like phosphorus, without prolonged aging times, drying four hours between 100° C. and 120° C. without calcination.

With the catalyst preparation procedure of the present invention, the formation of species difficult to be sulfided, also referred in the literature as refractory species to sulfidation, is limited by adding, simultaneously or successively, preferably successively, a metal of group VIB, a metal of group VIB in combination with a metal of group VIII, an additive such as phosphorus and a metal of group VI with an organic agent and a metal of group VIB and a metal of group VIII with an organic agent, without prolonged aging times, drying four hours between 100° C. and 120° C. without calcination procedure.

With the catalyst preparation procedure of the present invention, a good diffusion for the feedstock to be processed and for the reaction products is ensured, since this catalyst has good chemical and textural properties.

The catalyst preparation procedure is efficient to obtain catalysts capable of producing ultra low sulfur diesel, during the synthesis procedure of this invention, the support together with active metals and promoter, are not subjected to any calcination treatment.

By support material is meant any refractory metal oxide substrate such as alumina, silica, alumina-silica and their combinations, which possesses specific physical and chemical properties, which are described in detail below. The support is modified with selected elements of the periodic table, whose functions are to generate and uniformly disperse the active species, and promote the reactions of hydrodesulfurization, hydrodenitrogenation and hydrogenation.

By active agents are meant: the transition metal sulfides selected from Group VIB of the periodic table of the elements, which are described below in detail. By promoter metals are meant: those metals selected from Group VIII, which when present in the catalyst formulation in combination with said metals or active agents, are capable of resulting in a synergy capable of increasing the overall activity of the catalyst and/or the catalytic selectivity, to favor mostly certain reactions, whose type of promoters and contents thereof in the catalyst are described below in more detail in the present description.

The catalyst comprises salts and/or complexes of two metals of group VIB, preferably Mo and W, at least one transition metal of group VIII, preferably Ni, also an additive selected from group V, preferably phosphorus and an organic compound such as ethylene-diamino-tetra acetic acid (EDTA), diethylien-tiramino-penta acetic acid (DPTA), 1,3-diamino-2-propanol-N,N,N',N'-tetra acetic acid (DAHPTA), citric acid, tartaric acid, salicylic acid, preferably EDTA. The route used is efficient for supported sulfided metal catalysts, used to obtain ultra low sulfur diesel.

The catalytic composition of this invention has as a characteristic a moderate and dispersed metal loading on a support of the gamma-alumina type of high surface area, greater than 200 $m^2/g$. The active metal phases are added by successive impregnation in three stages. In the first stage, an aqueous solution containing a Group VI metal is impregnated to the alumina support, in the second stage, an acid solution containing a Group VI metal, another Group VIII metal and an additive selected from the VA group is impregnated; and in the third stage, two solutions of an alkaline character are impregnated, containing an organic agent, a metal from group VI, another metal from group VIII.

The catalyst support can be composed of a conventional refractory oxide such as alumina, silica or mixtures thereof, determined by X-ray analysis. The preferred refractory oxide is alumina, or alumina containing silica, and as the transition phase of alumina, gamma-type alumina is preferred. The acidity and other properties of the supports can be controlled by adding additives and/or dopants, or by controlling the nature of said supports. As additives and/or dopants may include elements such as phosphorus, boron, yttrium, rare earth oxide and magnesium. Additives such as halogens generally increase the acidity of the supports, while some basic dopants tend to decrease the acidity of such supports.

The support has specific physical properties of surface area, pore volume and pore volume distribution. The BET specific surface area properties comprise values between 200 to 400 $m^2/g$, the pore volume from 0.6 to 0.9 $cm^3/g$. Pore volumes which are preferred have a distribution from 1 to 5% of the pores smaller than 50 Å; 30 to 40% of pores between 50 and 100 Å, 50 to 60% of pores between 100 and 200 Å and 5 to 10% of pores larger than 200 Å, measured by $N_2$ physisorption.

The support material may have various geometric shapes: spheres, pellets, granules or extrudates. It is preferred that the catalyst of the present invention be in the form of an extrudate, the cross section of which can be of different shapes such as cylindrical, or with two or more lobes, for example, trilobal, tetralobular, etc. with nominal sizes of 1/16 and 1/20 of an inch.

Before starting the impregnation of the metallic solutions, the support is dried at temperatures from 100° to 200° C., to eliminate the physisorbed water. The drying time is from 4 to 12 hours.

In general, the procedure of preparation used in the preparation of commercial HDS catalysts, is through the impregnation of the supports with aqueous solutions of Mo, W, Co or Ni, looking to obtain higher metal dispersion and high concentrations of active phase that increase HDS activity in CoMo, NiMo and NiW type catalysts. To promote higher metallic dispersion and high concentrations of active phase, an additive is used in the catalytic formulation, such as phosphorus, fluorine and boron. New supports and new materials with high surface area and other convenient properties are also used. The alumina support has also been modified by mixing with zeolites and other metal oxides such as: $TiO_2$, $ZrO_2$, MgO, C, $SiO_2$, etc. to take advantage of the favorable characteristics of both systems.

The final structure of the molybdenum sulfide surface takes place during the last stage of preparation, where the oxide precursor is treated with sulfur containing agents ($H_2S/H_2$, DMDS, etc).

CHARACTERIZATION

By means of a temperature-programmed reduction ($H_2$-TPR) study, carried out in an AMI-200 instrument of the Zeton-Altamira company provided with a TCD detector, it is emphasized that with the catalyst preparation procedure of this invention, the preferential formation of octahedral molybdenum sites is favored, with a reduction profile at 400° C.; and the molybdenum decorated with nickel is observed in the region between 570-580° C., as can be seen in FIG. 1, where the reduction thermogram of the catalyst of this invention before being activated or sulfided is presented. There is very little or no evidence of species in their maximum oxidation state (tetrahedral signals, present over 600° C.), because the catalyst is not calcined, that indicates that the species of active metals are not refractory to sulfiding.

Figure 2:
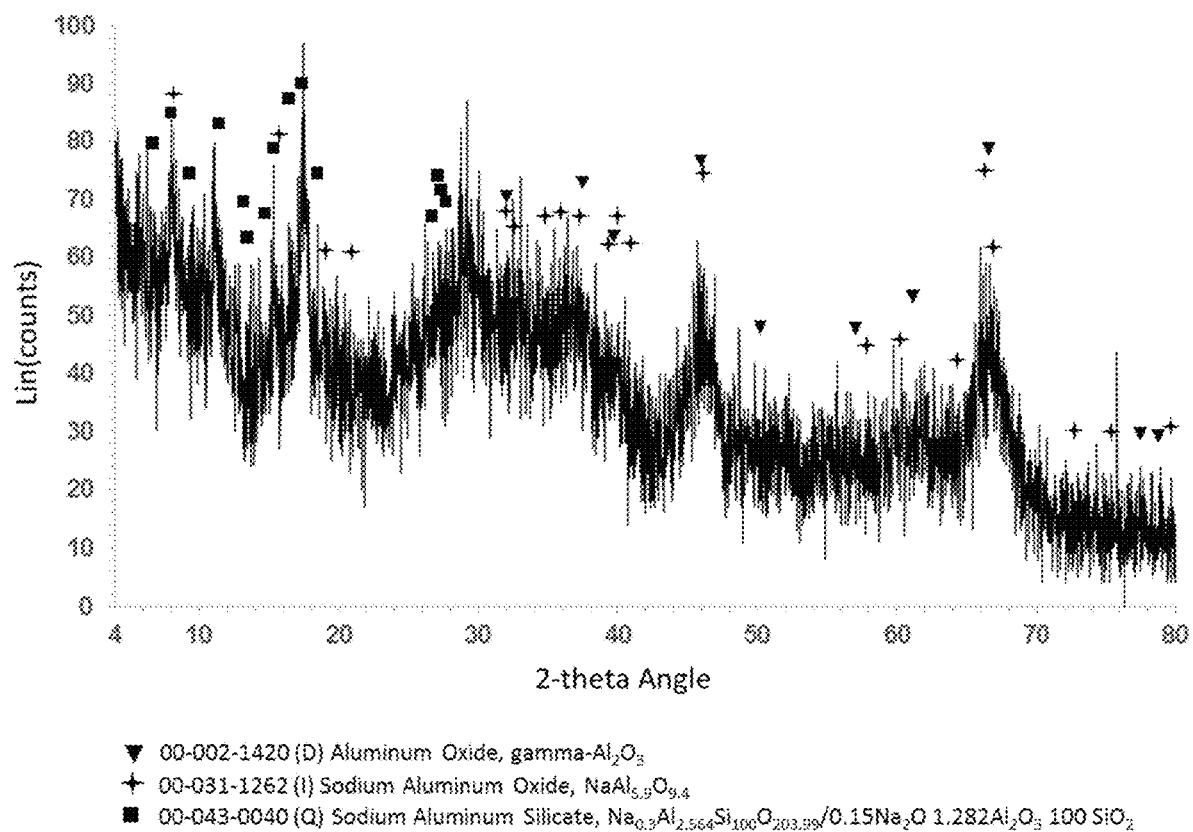

By means of an X-ray diffraction study (XRD), carried out in a Siemens D500 diffractometer, to the catalyst of this invention before being activated or sulfided, it features that a high dispersion of the active metals is favored with the preparation procedure, because no metal is detected in the catalyst, despite the medium-high metal content referred to the catalyst of this invention. It is also confirmed that with the catalyst preparation procedure of this invention, the metals do not interact with the support. The diffractogram obtained is presented in FIG. 2.

To determine the chemical composition and stoichiometry of the catalyst of this invention after being activated or sulfided, X-ray photoelectron spectroscopy (XPS) was used. The spectra were obtained with an XPS equipment brand Thermo VG Scientific Model Escalab 250 equipped with X-ray source of monochromatic radiation Al K-alpha of 1486.6 eV.

Figure 3:
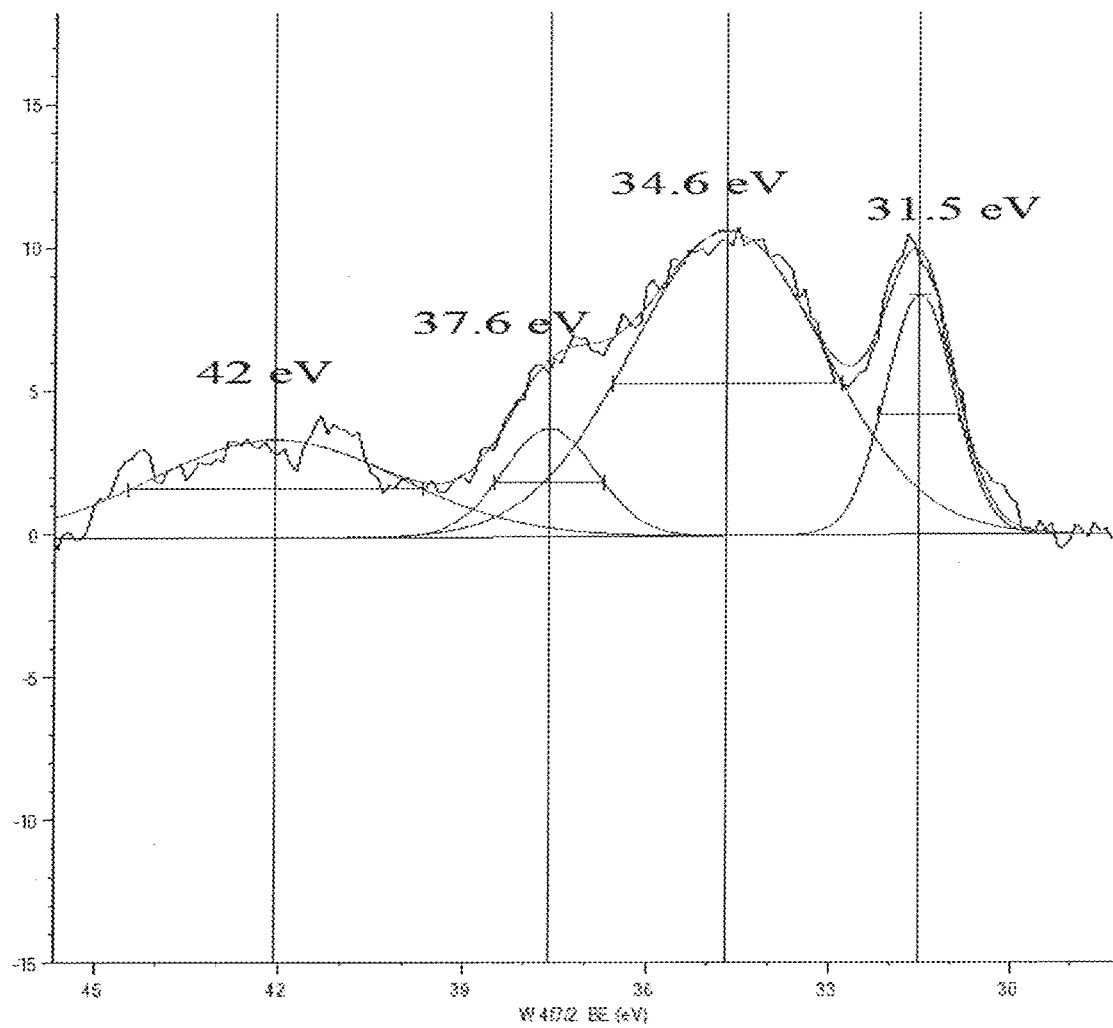
Figure 4:
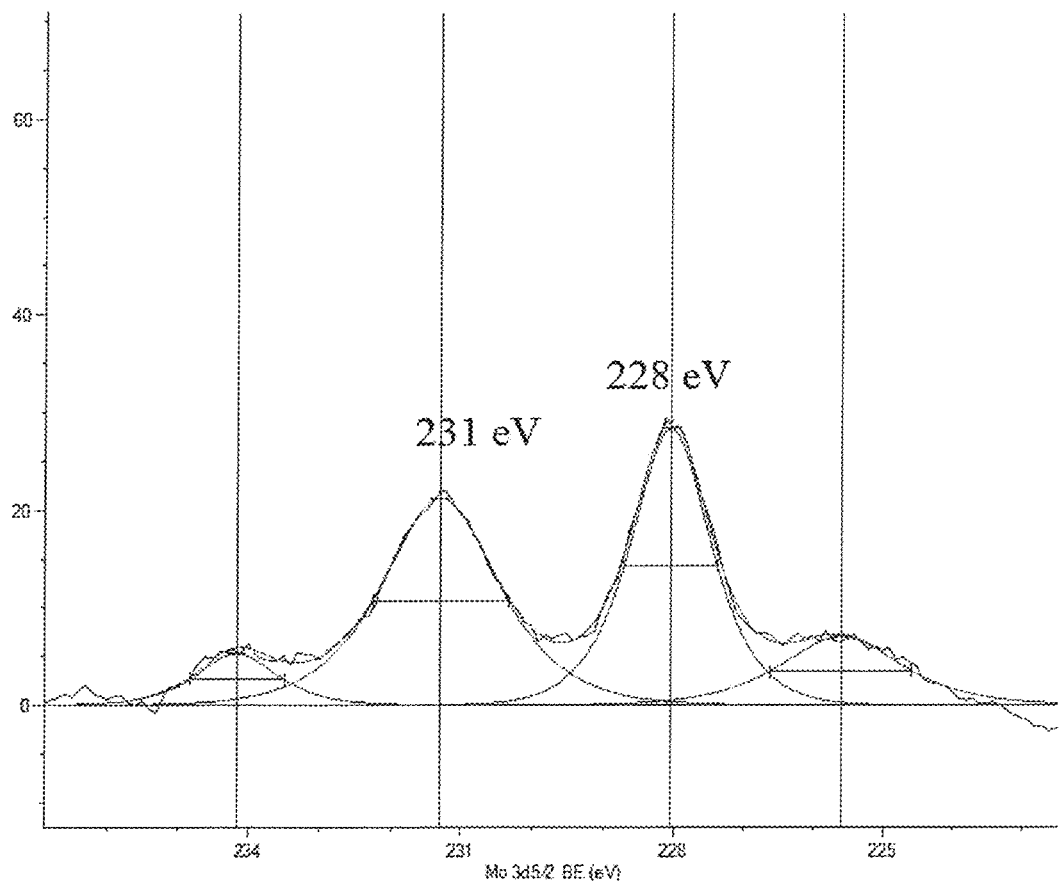

From the literature, it can be identified that $WO_3$ is characterized by three peaks with binding energies at 35.3 eV, 37.4 eV and 41.3 eV corresponding to the energy levels W $4f_{7/2}$, W $4f_{5/2}$ and W $5p_{3/2}$, respectively, these energies of union indicate a state of valence (6+) characteristic of tungsten oxide. The XPS spectrum of tungsten obtained from the catalyst of this invention (FIG. 3), presents two main valence signals at lower energies with respect to an oxide, valence characteristics of tungsten linked with S—instead of O—, so that, a change in the level W 4f and W 5p is observed. That is, the catalyst of this invention, after being sulfided, has mainly a partially reduced W peak in 34.6 eV and another peak of tungsten without oxygen at the valence state (4+) in 31.5 eV, as expected for $WS_2$. The catalyst of this invention, after being sulfided, still has the valence (6+, 42 eV) indicating a small layer of $WO_3$ on the surface of the alumina due to the preparation procedure In the same way the XPS spectrum of the sulfide molybdenum phase in the catalyst of this invention was analyzed (FIG. 4), the molybdenum region analyzed shows 2 characteristic peaks of $MoS_2$, located at 228 and 231 eV which indicates that the catalyst is well sulfided and the formation of $MoS_2$ species in a high percentage is confirmed. The total utilization of molybdenum on surface is confirmed after 72 hours of sulfiding time, the molybdenum oxide species disappeared, forming only active sulfided species.

The preparation and sulfiding procedure of the catalyst of the present invention promotes the formation of NiMoS and NiWMoS structures of high stacking and of short length with which ones, ultra low sulfur diesel can be obtained at moderate pressure, temperature and LHSV conditions, like to those of an industrial hydrotreating unit. The analysis of the stacking of NiMoS and NiWMoS species in the catalyst of the present invention was carried out by high resolution transmission electron microscopy (HRTEM) analysis in a JEOL 2010F microscope operated at 200 Kv (Cs=0.5 mm, point-to-point resolution of 0.19 nm). For the analysis, the NiMoW catalyst of the present invention, after being sulfided, was treated in the following manner: in a glove chamber with nitrogen environment, the catalyst was ground and suspended in isopropanol at room temperature; subsequently, it was dispersed using an ultrasonic bath. The suspension obtained was collected on a copper grid coated with carbon.

The catalyst of the present invention, after being sulfided and treated as described, it was examined focusing several fields of vision. On the microphotographs obtained, the number of $MoS_2$ (or $WS_2$) stacks was counted and measured laterally (spatial distance) and longitudinally (length of the structures).

The hexagonal form is the most likely form of $MoS_2$, HRTEM studies have shown that $MoS_2$ particles tend to be hexagonal. The morphology of this hexagonal structure, such as the stack length, the dispersion of the Mo in the edges and corners, the number of stacks and the number of "slabs" of $MoS_2$ in each "stack", play a very important role in the activity of HDN and HDS for this type of catalysts In sulfided catalysts the spatial distance between "slabs" of $MoS_2$ (S—Mo—S) is 0.616 nm and the unit repeats periodically on the surface of the catalyst.

Figure 5:
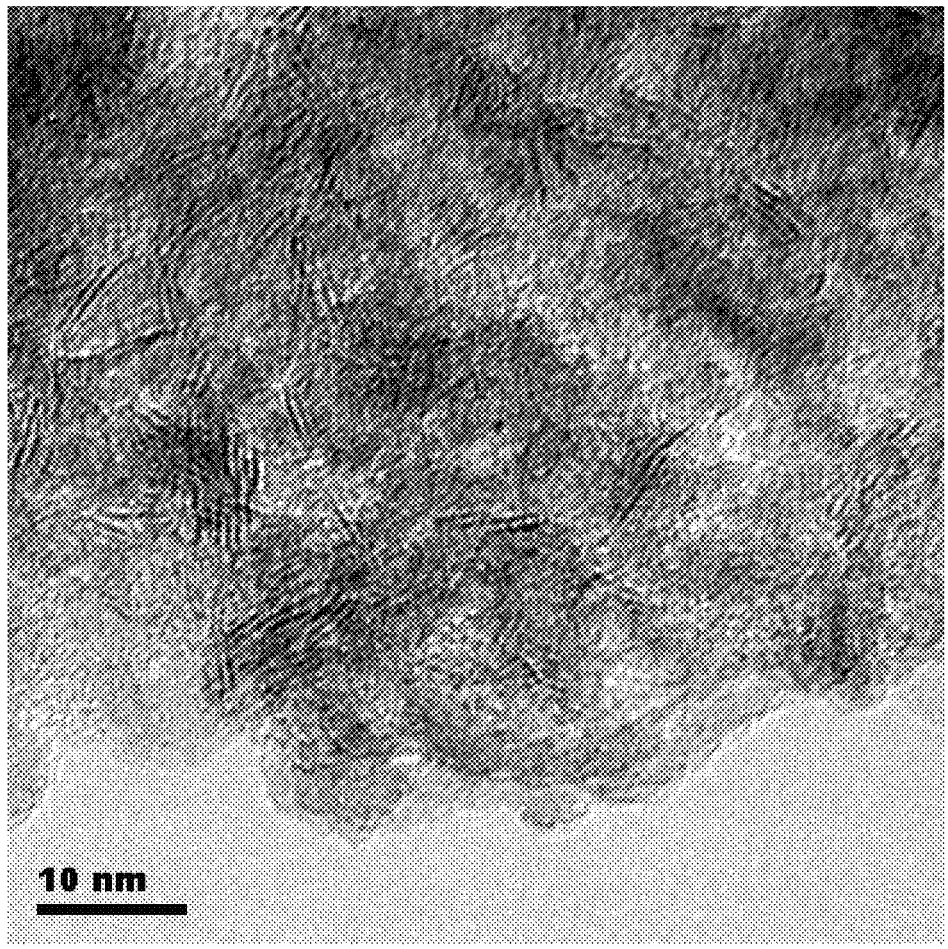
Figure 6:
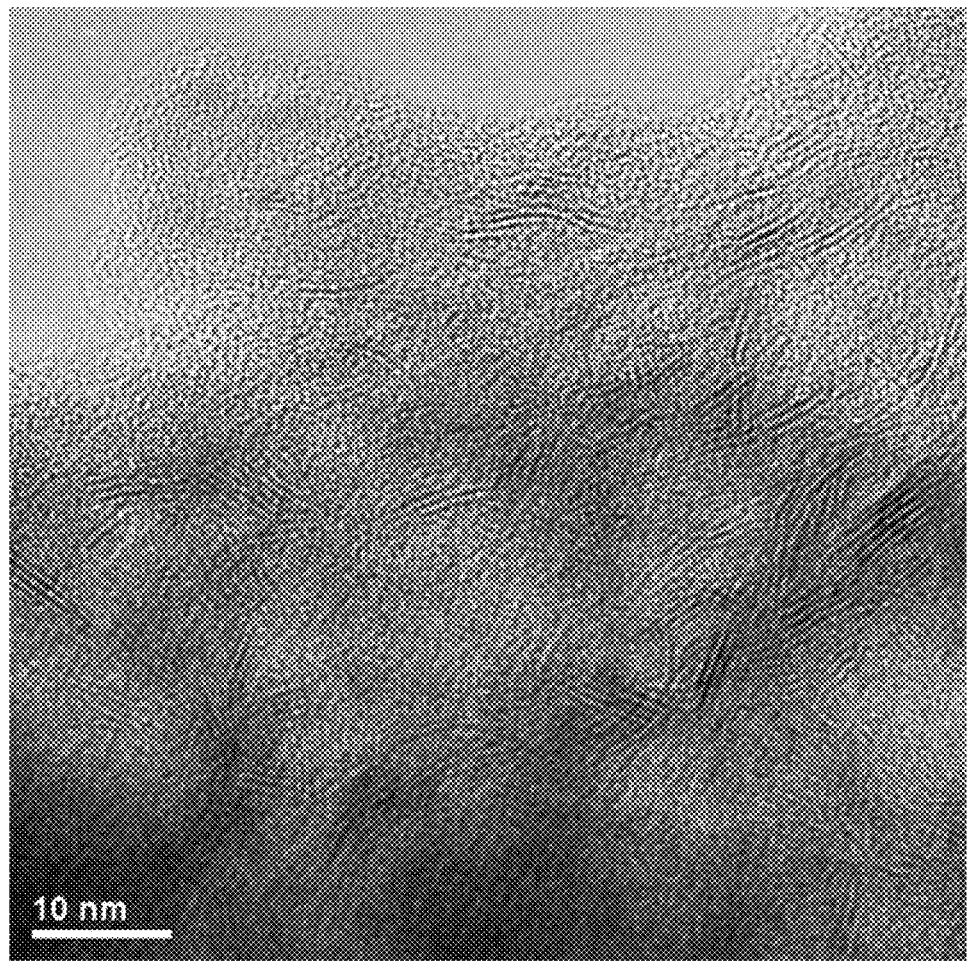

The average interlaminar spacing of the $NiWS_2$ structures was also measured in a catalyst that only contains nickel and tungsten, without molybdenum. This catalyst containing tungsten and nickel as active metals, was prepared by carrying out steps 1) of impregnation of tungsten and nickel and 2) sulfiding, according to the preparation procedure described for the catalyst of the present invention. The intention to prepare this catalyst with tungsten, nickel and its sulfiding is only to specifically confirm the d spatial distance (plane 002) in $WS_2$. In FIG. 5, the micrograph obtained when analyzing this sulfurized tungsten catalyst can be observed. From the analysis that was carried out, values of 0.64 nm were obtained for that intelaminar spacing in $WS_2$ "slabs". This value is very close to the corresponding value for the d-spacing distance (plane 002) of $WS_2$ reported in the literature at 0.627 nm. In FIG. 6, the micrograph that corresponds to the catalyst of the present invention after being sulfided can be observed. Due to the very close values presented by the $MoS_2$ and $WS_2$ species, by this characterization technique, they can not be differentiated.

Impregnation of Active Phases

The active metal phases are added by means of three specific solutions.

The first solution contains a metal of group VIB, such as Mo and W, preferably W, which is formed of a precursor compound of W such as ammonium metatungstate in aqueous solution.

The second solution (acid) contains a metal of group VIB such as Mo and W, preferably Mo, from a molybdenum metal precursor compound such as molybdenum trioxide, another metal from group VIII, such as Ni from the metal precursor compound of nickel, such as Nickel Acetate and an additive selected from group V, such as phosphorus, from a phosphorus precursor compound such as Phosphoric Acid.

The third solution (alkaline) is prepared from the mixture of two solutions, the first solution contains a group VIII metal such as Ni, from nickel hydroxycarbonate and an organic acid such as ethylenediaminetetraacetic acid (EDTA), dissolved in a ammonium hydroxide aqueous solution, the second solution contains a metal of group VIB as Mo from molybdenum trioxide, another metal from group VIII as Ni from nickel hydroxycarbonate, and an organic acid such as ethylenediaminetetraacetic acid (EDTA) dissolved in a ammonium hydroxide aqueous solution The organic acid is defined as a compound comprising at least one carboxylic compound (COOH). The organic acid is generally a carboxylic acid comprising from 1 to 20 carbon atoms (including the atoms of the carboxyl group), it can be tartaric acid, salicylic acid, citric acid and acids containing nitrogen groups such as ethylenediaminetetraacetic acid (EDTA), the last ones being the preferred compounds, since they are substances employed as chelating agents that can form complexes with a metal that has an octahedral coordination structure The support is placed in a crystallizing dish and the first metallic solution is added dropwise until a partial impregnation is obtained. Once the impregnation is finished, the support is placed in a porcelain capsule and remain for 10 to 15 hours aging. Subsequently, it is subjected to drying at a temperature of 100-120° C. for 3 to 5 hours.

The second metal solution is added dropwise to the support partially impregnated with tungsten, until a partial impregnation is obtained. Once the impregnation is finished, the support impregnated with the first and with the second solution is transferred to a porcelain capsule and left 8 to 10 hours for aging; then, it is subjected to drying at a temperature of 100 to 120° C. for 4 to 6 hours. A green material is obtained which releases a slight odor of acetic acid.

The support partially impregnated with the two solutions is placed in a crystallizing dish and the third metal solution, consisting of a mixture of two previously prepared solutions, is added dropwise until obtaining a complete impregnation, the impregnation can be slightly exothermic. Once the impregnation is finished, the impregnated material is allowed to stand in the extraction fume hood for 30-40 minutes to eliminate excess of moisture, no longer aging time is allowed. Subsequently, it is subjected to drying at room temperature at 200° C., preferably at 60 to 200° C. and time from 4 to 15 hours. A material with green coloration without odor or with a slight characteristic odor is obtained.

Finally, it is left to cool down and placed in a drying chamber to prevent it from getting wet from the environment.

The catalyst is only dried, but not calcined, to prevent the decomposition of the formed complexes and evaporation of the additive.

The total specific area of the catalyst of this invention is in the range 180 to 250 m$^2$/g (using the BET method). The pore volume of the catalyst product of this invention is generally in a range of 0.3 to 0.5 cm$^3$/g. The catalyst will have an average pore diameter in the range of 7 to 9 nm.

The metal of Group VIII, in its oxide phase, is present in an amount between 1 and 10% by weight, preferably between 3 and 6% by weight. The metals of the group VIB in their oxide phases are present in an amount that is between 12 and 30% by weight, preferably between 15 and 25% by weight. The VA group additive is present in an amount between 0.05 and 2% weight, preferably between 0.1 and 1.0% weight. The amount of organic acid is generally present between 0.05 and 2 mol per mol of group VIII metal, preferably between 0.1 and 1 mol per mol of group VIII metal.

Active Phase Sulfiding

Activation of the catalytic formulations consists of sulfiding the metallic species, converting them to metal sulfides, which are the active species for the hydrotreating reactions, preferably for hydrodesulfurization and hydrodenitrogenation; such sulfidation procedure being carried out prior to the evaluation of the catalytic activity, in the same micro and pilot unit where the catalytic activity evaluation is carried out; and was carried out in two stages a) wetting stage and b) sulfidation stage, as described below.

Wetting stage: a volume of catalyst is loaded in a fixed-bed reactor, feeding straight run gasoil doped with Dimethyldisulfide (DMDS) until having a sulfur content above 2.0% by weight, at a liquid hourly space velocity of 3 h$^{-1}$, H$_2$ flow is aligned and simultaneously temperature of the catalytic bed is increased up to 290° C. at a rate of 10° C./h, these conditions are maintained for 15 hours at a pressure of 56 Kg/cm$^2$. Sulfiding stage: maintain the pressure of 56 Kg/cm$^2$, increase the temperature from 290° C. to 310° C. at a rate of 10° C./h, and increase the H$_2$ flow, maintain these conditions for 2 hours. Then increase the temperature from 310° C. to 321° C., at a rate of 3° C./h, and stabilize the conditions for a time of 8 hours.

Hydrotreating Process

The term "Hydrotreatment" includes the processes in which the hydrocarbon feed reacts with hydrogen at suitable temperature and pressure and refers to the processes of hydrogenation, hydrodesulfurization, hydrodesnitrogenation, hydrodemetalation and hydrodearomatization. The experimentation in this invention is focused to the processes of hydrodesulfurization and hydrodesnitrogenation.

The conditions of the hydrotreating process include temperatures in the range of 320 to 400° C., preferably 340 to 380° C., liquid hourly space velocity (LHSV) in the range of 0.5 to 3.0 h$^{-1}$, preferably 0.7 to 1.25 h$^{-1}$, hydrogen pressure of 46 to 80 Kg/cm$^2$ (4511 to 7845 KPa), preferably 55 to 70 Kg/cm$^2$ (5394 to 6865 KPa), hydrogen to hydrocarbon ratio from 1000 to 5000 ft$^3$/B, preferably 2000 to 2500 ft$^3$/B.

The hydrotreatment process reduces the content of sulfur and nitrogen contaminants in hydrocarbon cuts, converting those contaminants to hydrogen sulfide and ammonium, respectively. These gaseous contaminants can be separated from the hydrotreated feed using conventional separation techniques.

The reaction step in the hydrotreating process may consist of one or more fixed bed reactors, which may comprise one or more catalytic beds with the hydrotreating catalyst.

Heating or cooling zones can also be used between reactors or between catalytic beds in the same reactor, since the hydrodesulfurization reaction is an exothermic reaction. A part of the heat generated during hydrotreating can be recovered.

The catalytic behavior of the catalyst object of this invention was performed using to straight run gasoil (SRGO) of medium difficulty for hydrodesulfurization from refinery No. 1 and SRGO of high difficulty to hydrodesulfurization due to the high content of refractory sulfur compounds coming from the refinery No. 2, mixed with light cyclic oil (LCO) from refinery No. 2, following the procedure described below: at the end of the activation stage, adjust the gas flow (hydrogen) to have an H$_2$/HC ratio of 2500 ft$^3$/bbl, align the feed of straight run gasoil (SRGO) or SRGO/LCO mixture to have an LHSV of 1.0 to 1.5 h$^{-1}$, increase the temperature from 321 to 340° C. at a rate of 3° C./h and pressure of 56 Kg/cm$^2$ to start the hydrotreating test. Maintain the above mentioned conditions during a stabilization period of 72 hours. The hydrotreating catalyst of the present invention possesses high activity for HDS and HDN of middle distillates, attributable to the preparation procedure, to the sulfidation and stabilization sequence.

The feeds available to be hydrodesulfurized by the catalysts of this invention include middle distillates such as straight run gasoil (SRGO), light cyclic oil (LCO) and mixtures thereof, for the production of diesel with ultra low sulfur content.

Available feeds of SRGO with medium-difficulty to hydrodesulfurization include middle distillates with boiling points in the range of 204 to 363° C. (ASTM D-86), sulfur concentration of 1.32% by weight and 366 ppm of nitrogen; the SRGO with high difficulty to hydrodesulfurization has boiling points in the range of 188 to 383° C. (ASTM D-86), sulfur concentration of 1.4% by weight and 368 ppm of nitrogen, the LCO has boiling points in the range of 237 to 281° C. (ASTM D 86), sulfur content of 3.57% by weight, 102 ppm of nitrogen and 87% by weight of total aromatics. The content of sulfur in the feeds was determined by the method ASTM D-4294 in an X-ray equipment, Horiba brand. The concentration of sulfur in the products (less than 100 ppm) was determined applying the method ASTM D-5453 in an Antek 9000 equipment, the concentration of Nitrogen in feeds and products was determined applying the method ASTM D-4629 in an Antek 9000 equipment.

Properties of the feeds used in the catalytic tests are presented in Table No. 1

Figure 7:
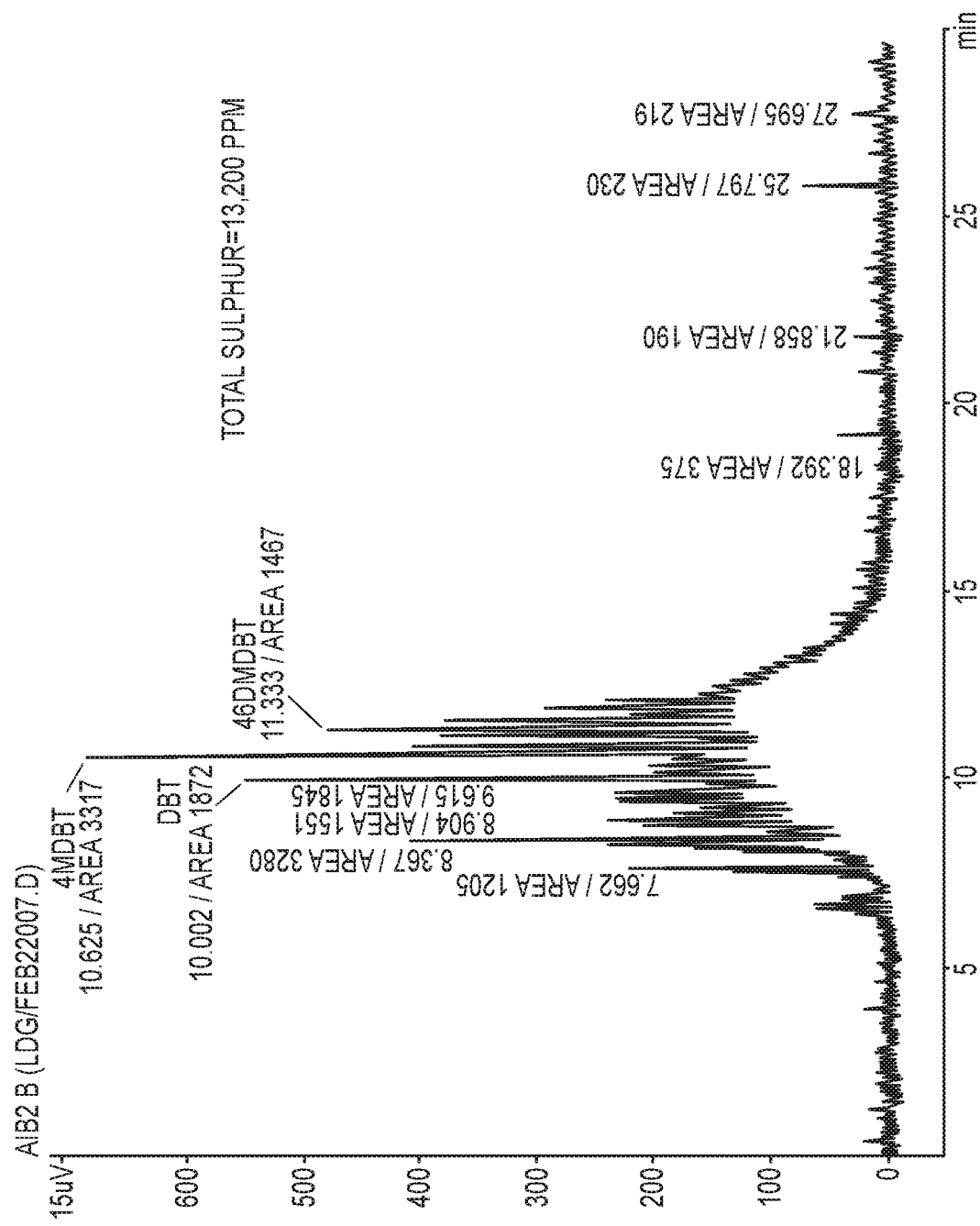
FIG. 7 Shows the sulfur species present in the LGO from refinery No. 1 analyzed by gas chromatography coupled with a sulfur selective detector (SIEVERS).
Figure 8:
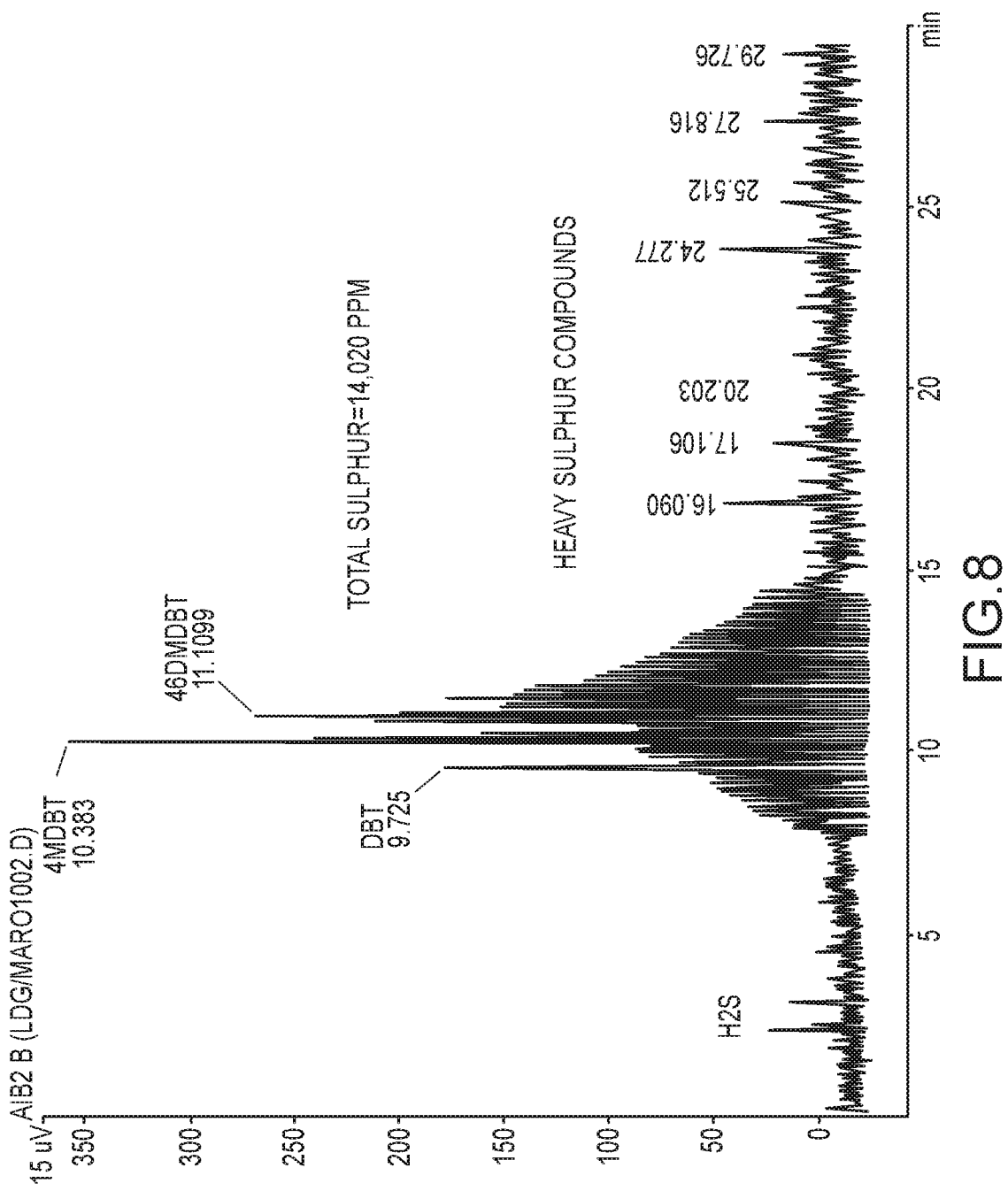
FIG. 8 Shows the sulfur species present in the LGO from refinery No. 2 analyzed by gas chromatography coupled with a sulfur selective detector (SIEVERS).

The sulfur species contained in the SRGO were analyzed by gas chromatography coupled with a selective sulfur detector (Sievers). The sulfur species present in the SRGO from refinery No. 1 are shown in FIG. 7, where mainly refractory sulfur compounds of type 4-methyl-dibenzothiophene (4-MDBT) and 4,6-dimethyldibenzothiophene (4,6-DMDBT) and other heavier sulfur compounds are observed.

The sulfur species present in the SRGO from Refinery No. 2 are shown in Figure No. 8, where mainly refractory sulfur compounds of the DBT, 4-MDBT and 4,6-DMDBT and other sulfur compounds of high molecular weight, with retention time in the column of 17.10, 24.27 and 27.81 minutes, are observed.

TABLE No. 1

Chemical and physical analyzes of the feeds of straight run gasoil (SRGO), light cyclic oil (LCO) and mixture, used for the evaluation of the catalytic formulations.

| Property | Method | SRGO-1 Cadereyta Refinery | SRGO-2 Tula Refinery | LCO Tula Refinery | Mixture of SRGO/LCO (80/20) |
|---|---|---|---|---|---|
| Specific weight, 20/4° C. | ASTM D-1282 | 0.834 | 0.8668 | 0.9751 | |
| Atmospheric distillation, % by volume | | | | | |
| IBP | ASTM D-86 | 204 | 188.0 | 237.7 | 210 |
| 5 | | | 261.8 | 243.7 | |
| 10 | | | 281.5 | 245.0 | |
| 20 | | | 301.2 | 246.8 | |
| 30 | | | 312.9 | 248.3 | |
| 40 | | | 321.2 | 249.6 | |
| 50 | | 285 | 328.1 | 251.0 | 306 |
| 60 | | | 334.7 | 252.7 | |
| 70 | | | 342.1 | 254.8 | |
| 80 | | | 350.5 | 257.7 | |
| 90 | | | 363.0 | 262.5 | |
| 95 | | | 374.7 | 267.7 | |
| FBP | | 363 | 383.2 | 281.0 | 380 |
| Cetane Index | ASTM-4737 | | 49.6 | 15.3 | |
| Kinematic viscosity at 40° C., mm$^2$/s | ASTM-D445 | | 6.0 | 2.1 | |
| Aniline temperature, ° C. | ASTM-D611 | | 72.4 | 24.0 | |
| Total sulfur, ppm | ASTM D-4294 | 13,200 | 14,020 | 35,700 | 18,110 |
| Total Nitrogen, ppm | ASTM D-4629 | 366 | 412 | 102 | 328 |
| Basic Nitrogen, ppm | UOP-269-90 | 90.0 | 93.0 | 12.1 | 88.0 |
| Total Aromatics, % by weight | ASTM D-5186 | 25.7 | 32.8 | 87.1 | 44.4 |
| Mono Aromatics, by weight | ASTM D-5186 | 16.3 | 18.9 | 8.9 | 16.4 |
| Di Aromatics, by weight | ASTM D-5186 | 7.2 | 10.7 | 77.2 | 25.5 |
| Poly Aromatics, by weight | ASTM D-5186 | 2.2 | 3.2 | 1.0 | 2.5 |

The following are some examples of the preparation of catalysts according to the present invention, as well as examples of application, must be understood that such examples are only illustrative and are not intended to limit the scope of the invention.

EXAMPLES

Preparation of Catalysts

Catalytic Supports

For preparation of the catalytic formulation of the present invention, two different catalytic supports of gamma-type alumina were used, whose properties are shown in Table No. 2, all of them with commercially available properties. The supports were denominated as SOP—B and SOP-D.

TABLE No. 2

Properties of catalytic supports used in the preparation of the catalysts of the present invention

| Extrudate shape | SOP-B cylindrical extrudate | SOP-D Tree-lobed extrudate |
|---|---|---|
| Nominal size, inch | 1/16 | 1/20 |
| Specific Surface Area, m$^2$/g | 211 | 262 |
| Pore volume, cm$^3$/g | 0.69 | 0.77 |
| Average pore diameter, Å | 128 | 116 |
| Distribution of pore volume, % by vol | | |
| <50 Angstroms | 0.8 | 0.9 |
| 50-100 Angstroms | 45.7 | 33.0 |
| 100-200 Angstroms | 45.1 | 58.6 |
| >200 Angstroms | 8.4 | 7.5 |
| Porosity (water)[1] | 0.95 | 0.90 |
| Crush strength, Kg/mm | 1.53 | NA |
| X-Ray Diffraction (DRX) | Alumina gamma | Alumina gamma |

[1]Porosity with water is measured as the volume of water necessary to saturate the pores of the support material per gram of support material; said porosity is used to calculate the volume of the solutions to be impregnated.

Reagents

For preparation of the catalytic formulation of the present invention, the reagents indicated in Table No. 3 were used, however, it should be understood that these are only by the way of example and that equivalent reagents can be used.

TABLE No. 3

Reagents used for the preparation of the catalysts of the present invention

| Reagents | Formula | Purity (%) |
|---|---|---|
| Ammonium metatungstate | (NH4)6 H2W12O40 X H2O con X ≥ 18 | 85 |
| Molybdenum trioxide | MoO$_3$ | 99.6 |
| Nickel Acetate | Ni(OCOCH$_3$)$_2$ · 4H$_2$O | 23.5% Ni |
| Nickel Hydroxycarbonate | 2NiCO$_3$ · 3Ni(OH)$_2$ · 4H$_2$O | 46.7% Ni |
| Phosphoric acid | H$_3$PO$_4$ | 85.0 |
| Ethylenediamine-tetraacetic acid (EDTA) | (HO$_2$CCH$_2$)$_2$NCH$_2$CH$_2$N(CH$_2$CO$_2$H)$_2$ | 99.5 |

Preparation of Impregnating Solutions:
Aqueous Solution of W (Solution A)
a) The ammonium metatungstate salt is weighed and dissolved in distilled water.
b) The aqueous solution of W is constantly stirred until obtaining a completely transparent and crystalline solution Acid Solution of Mo—Ni—P (Solution B)
a) Molybdenum trioxide and nickel acetate are weighed separately.
b) Molybdenum trioxide and nickel acetate are physically mixed.
c) In a three-neck flask, the phosphoric acid is weighed and distilled water is added.
d) The physical mixture of metals is added slowly to the phosphoric acid solution.
e) To the flask with the suspension, a reflux system is adapted, agitation is initiated and the temperature is increased to 80° C. At this temperature, it is allowed to react for 16 to 24 hours or until a characteristic green solution is obtained.

Ni and Organic Acid Solution (Solution C)
a) Nickel hydroxycarbonate and ethylenediaminetetraacetic acid (EDTA) are weighed separately.
b) In a 3-neck flask, a solution of ammonium hydroxide and water is prepared, then a reflux system is adapted, with stirring.
c) Nickel hydroxycarbonate and EDTA are slowly added to the aqueous solution of ammonium hydroxide.
d) The reaction is rapid and very exothermic, so it is allowed to reach room temperature.

Mo—Ni-Organic Acid Solution (Solution D)
a) the nickel hydroxycarbonate, the molybdenum trioxide and the ethylenediaminetetraacetic acid (EDTA) are weighed separately.
b) In a 3-neck flask, prepare a 1:1 solution of ammonium hydroxide and water, then a reflux system is adapted, with stirring.
c) Nickel hydroxycarbonate, molybdenum trioxide and EDTA are added slowly to the aqueous solution of ammonium hydroxide.
d) The reaction is rapid and very exothermic, so it is allowed to reach room temperature.

Solution E (Mixture of the Solution C+D)
a) Solution C and solution D are mixed at room temperature and with stirring.

Alkaline Solution Mo—Ni (Solution F)
a) The molybdenum trioxide and the nickel hydroxycarbonate are weighed separately.
b) The Molybdenum trioxide and the nickel hydroxycarbonate are physically mixed.
c) In a 3-neck flask, a solution of ammonium hydroxide and water is prepared and then a reflux system is adapted, with stirring.
d) Nickel hydroxycarbonate and molybdenum trioxide are added slowly to the aqueous solution of ammonium hydroxide.
e) The reaction is rapid and very exothermic, so it is allowed to reach room temperature.

Example No. 1 (CAT-1)

Step 1) Tungsten Impregnation:
A catalyst (named CAT-1) was prepared, using the catalytic support named Sop-D, which is weighed, placed in a porcelain dish and dried at a temperature of 100 to 120° C. for 3 to 6 hours. The impregnation of solution A is done by adding the solution by dripping, homogenizing the support until the entire volume of solution is added. When the impregnation is complete, the impregnated material is kept in ageing for 10 to 15 hours. Subsequently, it is subjected to a drying treatment at 100-120° C. for 3-5 hours. Then weigh it and proceed to step 2.

Step 2) Impregnation of Molybdenum-Nickel-Phosphorus, by Acid Route.
The tungsten on alumina material obtained in step 1 is slowly impregnated with the acid solution B of NiMoP. The impregnation of solution B is carried out by adding the solution by dripping, the support is homogenized until the entire volume of solution is added. When the impregnation is completed, the impregnated material is kept in ageing for 8 to 10 hours. Subsequently, it is subjected to a drying treatment at 100-120° C. for 4 to 6 hours. A characteristic green material is obtained which releases a slight odor of acetic acid. Weigh it and proceed to step 3.

Step 3) Impregnation of Solutions with Organic Agent.
The Tungsten material, partially impregnated with Molybdenum, Nickel and Phosphorus, obtained in step 2 of this Example 1, is slowly impregnated with the E solution Ni—Mo-EDTA. The impregnation of solution E is carried out adding the solution by dripping, the support is homogenized until adding the entire volume of solution.

When the impregnation ends, the impregnated material is kept in ageing in an extraction fume hood for 30-40 minutes to remove excess moisture, no longer aging time is allowed, at this point, the material has a light blue color with intense ammonia odor. Later, it is subjected to a drying treatment at 60 to 200° C. for 4-15 hours. A light-green material is obtained, without odor or with a slight characteristic odor; it is named CAT-1.

Example No. 2 (CAT-2)

Step 1) Tungsten Impregnation:
A catalyst (named CAT-2) was prepared, using the catalytic support named Sop-B, which is weighed, placed in a porcelain dish and dried at a temperature from 100-120° C. for 3 to 6 hours. The impregnation of solution A is done by adding the solution by dripping, the support is homogenized until the entire volume of solution is added. When the impregnation is completed, the impregnated material is kept in ageing for 10 to 15 hours. Later, it is subjected to a drying treatment at 100-120° C. for 3-5 hours. Weigh it and proceed to step 2.

Step 2) Impregnation of Molybdenum-Nickel-Phosphorus.
The tungsten on alumina material obtained in step 1 of this example 2 is slowly impregnated with the acid solution B of NiMoP. The impregnation of solution B is carried out by adding the solution by dripping, the support is homogenized until the entire volume of solution is added. When the impregnation is completed, the impregnated material is kept in ageing for 8 to 10 hours. Later, it is subjected to a drying treatment at 100-120° C. for 4 to 6 hours. A characteristic green material is obtained which releases a slight odor of acetic acid. Weigh it and proceed to step 3.

Step 3) Impregnation of Solutions with Organic Agent.
The Tungsten material, partially impregnated with Molybdenum, Nickel and Phosphorus, obtained in step 2 of this Example 2, is slowly impregnated with the solution E of Ni—Mo-EDTA. The impregnation of solution E is carried out by adding the solution by dripping, the support is homogenized until the entire volume of solution is added.

When the impregnation ends, the impregnated material is kept in ageing in a extraction fume hood for 30-40 minutes to remove excess moisture, no longer aging time is allowed, at this point, the material has a light blue color with an intense Ammonia odor. Later, it is subjected to a drying treatment at 60 to 200° C., for 4-15 hours. A light-green material is obtained, without odor or with a characteristic odor, named CAT-2.

Example No. 3 (CAT-3, Preparation of CAT-1 Catalytic Formulation by Alkaline Route)

Step 1) Tungsten Impregnation:

A catalyst (named CAT-3) was prepared, using the catalytic support named Sop-D, which is dried and impregnated with solution A, in the same manner as the catalyst (named CAT-1) of Example 1. Weigh it and proceed to step 2.

Step 2) Molybdenum-Nickel Impregnation.

The tungsten material in alumina obtained in step 1 in this example is slowly impregnated with the solution F of NiMo. The impregnation of solution F is carried out by adding the solution by dripping, the support is homogenized until the entire volume of solution is added. When the impregnation is completed, the impregnated material is kept in ageing for 8 to 10 hours. Subsequently, it is subjected to a drying treatment at 100-120° C. for 4 to 6 hours. A characteristic blue material is obtained which releases a slight ammonia odor. Weigh it and proceed to step 3.

Step 3) Impregnation of Solutions with Organic Agent.

The Tungsten material, partially impregnated with Molybdenum and Nickel, obtained from step 2, is slowly impregnated with the solution E of Ni—Mo-EDTA. The impregnation of solution E is carried out by adding the solution by dripping, the support is homogenized until the entire volume of solution is added.

When the impregnation ends, the impregnated material is kept in ageing in a extraction fume hood for 30-40 minutes to remove excess moisture, no longer aging time is allowed, at this point, the material has a light blue color with an intense Ammonia odor. Subsequently, it is subjected to a drying treatment at 60 to 200° C., during 4-15 hours. A light-blue material is obtained, without odor or with a slight characteristic odor, it is named CAT-3.

Example No. 4 Evaluation of Catalytic Formulation CAT-1 with SRGO from Refinery No. 1 in a Micro Plant The catalytic activity of the catalyst obtained in Example 1 of the present invention (CAT-1) was determined by the hydrodesulfurization of straight run gasoil from refinery No. 1, in order to obtain ultralow sulfur diesel, in a microplant (10 ml of catalyst) with a fixed-bed reactor with upward flow, after sulfiding of the catalyst. The physical and chemical properties of gasoil are shown in Table No. 1. The operating conditions of the micro reaction unit which the evaluation was carried out were: temperature from 350 to 370° C., pressure of 56 Kg/cm$^2$, LHSV of 1.5 h$^{-1}$ and H$_2$/HC ratio of 2500 ft$^3$/bbl.

Similar conditions were used for the evaluation of the catalyst obtained in Example 3 of the present invention (CAT-3).

The content of sulfur and nitrogen in the diesel product are shown in Table No. 3

Example No. 5 Evaluation of Catalytic Formulation CAT-1 with SRGO from Refinery No. 1 in a Pilot Plant The catalytic activity of the catalyst obtained in Example 1 of the present invention (CAT-1), was determined by the hydrodesulfurization of straight run gasoil from refinery No. 1, in order to obtain ultra low sulfur diesel, in a unit with a fixed bed reactor (50 ml of catalyst) with upward flow, after sulfiding of the catalyst. The physical and chemical properties of the gasoil are presented in Table No. 1, the evaluation conditions were: temperature from 350 to 370° C., pressure of 56 Kg/cm$^2$, LHSV of 1.5 h$^{-1}$ and H$_2$/HC ratio of 2500 ft$^3$/bbl.

The results of sulfur and nitrogen content in the diesel product are shown in Table No. 3

TABLE NO. 3

Sulfur and Nitrogen in the reaction products, with SRGO from Refinery No. 1

| | SRGO Feed | | | | Temp. ° C. | | |
|---|---|---|---|---|---|---|---|
| | | | | | 350 | 360 | 370 |
| Catalyst | Sulfur ppm | Nitrogen ppm | LHSV, h$^{-1}$ | Pressure, Kg/cm$^2$ | Sulfur in product, ppm | | |
| CAT-1 (micro plant) | 13,200 | 366 | 1.5 | 56 | 20 | 8 | 6 |
| CAT-1 (pilot plant) | 13,200 | 366 | 1.5 | 56 | 17 | 16 | 9 |
| CAT-3 | 13,200 | 366 | 1.5 | 56 | 185 | 118 | 46 |

The total nitrogen content in the Diesel product was lower than 0.3 ppm at the reaction temperature of 360° C. in all the catalytic tests.

The CAT-1 that has the NiMoWP formulation, prepared on sop-D, was evaluated at 56 Kg/cm$^2$ of pressure and 1.5 h$^{-1}$ of LHSV; a diesel product with 20 ppm of sulfur was obtained at 350° C., this level decreased up to 8 and 6 ppm of sulfur at 360° C. and 370° C. respectively when using a SRGO with 13200 ppm, ULS diesel was therefore obtained. The same formulation was evaluated in a pilot plant under similar operation conditions and SRGO feed; diesel products with 17 ppm of sulfur at 350° C. and 9 ppm of sulfur at 370° C. were obtained.

As an object of comparison with the formulation of this invention, the CAT-3 formulation prepared by the alkaline route, reported higher sulfur levels than the CAT-1 formulation; 185 ppm of sulfur were obtained at 350° C., 46 ppm of sulfur were achieved at 370° C. These results indicate that the procedure of preparation by acid route provides catalytic formulations with higher catalytic activity.

Example No. 6 Evaluation of the CAT-1 and CAT-2 Catalytic Formulations with Straight Run Gasoil from Refinery No. 2 and Mixtures of Straight Run Gasoil-Light Cyclic Oil (SRGO+LCO)

The catalytic activity of the catalysts obtained in Examples 1 and 2 (CAT-1 and CAT-2, respectively) of the present invention was tested in the hydrodesulfurization reaction of SRGO and SRGO/LCO mixtures (in an 80/20 by volume ratio) from refinery No. 2, in order to obtain ultralow sulfur diesel. The tests were carried out in a plant with a fixed bed reactor (60 ml of catalyst) with upward flow. The characteristics of SRGO, LCO and SRGO/LCO mixtures are shown in table No. 1. The operating conditions of the evaluation unit were: temperature of 324 to 368° C., pressure of 54 Kg/cm$^2$, LHSV of 0.8 to 1.25 h$^{-1}$ and H$_2$/HC ratio of 2500 ft$^3$/bbl. Sulfur and nitrogen contents in the diesel product are presented in Table No. 4

TABLE NO. 4

Sulfur and nitrogen in reaction products, with SRGO from refinery No. 2

| Catalyst | SRGO Feed Sulfur ppm | Nitrogen ppm | LHSV, h$^{-1}$ | Pressure, Kg/cm$^2$ | Temperature, ° C. 357 Sulfur in product, ppm | 368 |
|---|---|---|---|---|---|---|
| CAT-2 | 14,020 | 412 | 1.25 | 54 | 288 | 84 |
| CAT-1 | 14,020 | 412 | 1.25 | 54 | 155 | 78 |
| CAT-1 | 14,020 | 412 | 1.0 | 54 | 136 | 35 |
| CAT-1 | 14,020 | 412 | 0.8 | 54 | 86 | 20 |
| | SRGO + LCO (80/20) Feed | | | | | |
| CAT-2 | 18,110 | 328 | 1.25 | 54 | 147 | 146 |
| CAT-1 | 18,110 | 328 | 1.25 | 54 | 153 | 116 |

The CAT-2 prepared on Sop-B, was evaluated at 54 Kg/cm$^2$ of pressure and 1.25 h$^{-1}$ of LHSV, using the straight run gasoil feed with high content of refractory compounds and high difficulty to desulfurize from refinery No. 2, presented a hydrodesulfurization activity that achieved the reduction of the sulfur content to 288 and 84 ppm of sulfur at 357 and 368° C. in the product, respectively.

Table No. 4 shows the effect of the space-velocity (LHSV) reduction over the sulfur content in the desulfurized product, the CAT-1 formulation, prepared on sop-D, presented a Hydrodesulfurization activity that allowed to obtain a sulfur content in the product of 155 and 78 ppm at 357 and 368° C. respectively, for LHSV at 1.25 h$^{-1}$.

The reduction in the process severity when operating the evaluation unit at lower LHSV (at 1.0 h$^{-1}$), allows to obtain sulfur content of 136 and 35 ppm at 357 and 368° C. respectively. At lower severity (LHSV at 0.8 h$^{-1}$), the sulfur content in the diesel product decreases to 86 and 20 ppm at 357 and 368° C. respectively. Sulfur species not removed from SRGO at 357° C. and 368° C. were of higher molecular weight than 4,6-DMDBT type refractory sulfur compounds, which are concentrated in the fraction with boiling temperatures above 370° C.

The formulation of the prototype CAT-1 was evaluated by modifying the type of feed, by a mixture of SRGO/LCO (80/20% by volume), with a content of 18,110 ppm of sulfur. The operating conditions of the evaluation unit were the next: 54 Kg/cm$^2$ of pressure, 1.25 h$^{-1}$ of LHSV and 2500 ft$^3$/bbl of H$_2$/HC ratio. The catalyst exhibited a Hydrodesulfurization activity that reduced the concentration of sulfur compounds in the product to 153 and 116 ppm of sulfur at 363 and 368° C. The CAT-2 formulation evaluated at similar operating conditions showed a hydrodesulfurization activity that allowed the reduction of the sulfur concentration in the product to levels of 147 and 146 ppm respectively.

The invention claimed is:
1. A manufacturing method to obtain a trimetallic catalyst for use with production of ultra low sulfur diesel (ULSD), the method comprising
  preparing a first solution having a metal of group VIB that includes tungsten;
  preparing a second solution having a metal of group VIB that includes molybdenum, a metal of group VIIIB that includes nickel and phosphorus;
  preparing a third solution having a metal of group VIIIB that includes nickel and ethylene-diamino-tetra acetic acid;
  preparing a fourth solution having a metal of group VIIIB that includes nickel, a metal of group VIB that includes molybdenum and ethylene-diamino-tetra acetic acid;
  mixing the third and fourth solutions and drying an alumina support at a temperature of 100 to 120° C., for 3 to 6 hours, followed by;
  impregnating the alumina support with the first solution and aging material from the first solution after impregnation for 10 to 15 hours and then drying at a temperature of 100 to 120° C. for 3 to 5 hours, followed by;
  impregnating the alumina support with the second solution and aging material from the second solution after impregnation for 8 to 10 hours and then drying at a temperature of 100 to 120° C. for 4 to 6 hours, followed by;
  impregnating the alumina support with the mixture of the third and fourth solutions and aging material from the mixture after impregnation for 30-40 minutes and then drying at a temperature of 60 to 200° C., for 4 to 15 hours;
  wherein impregnating the alumina support with the first solution, the second solution and the mixture obtains a hydrotreating catalyst;
  impregnating the hydrotreating catalyst with straight run gasoil; and
  sulfiding the hydrotreating catalyst to produce a resultant catalyst.

2. The method of claim 1, further comprising:
  a) producing an aqueous solution for the resultant catalyst containing a metal of group VIB that includes tungsten, from ammonium metatungstate in water, until obtaining a transparent and crystalline solution;
  b) producing an acid solution containing a metal of group VIB that includes molybdenum and a metal of group VIIIB that includes nickel, dissolved in a phosphoric acid solution;
  c) producing a solution containing a metal of group VIIIB that includes nickel, and an organic compound dissolved in an aqueous solution of ammonium hydroxide;
  d) producing a solution containing a metal of group VIB that includes molybdenum, a metal of group VIIIB that includes nickel, and an organic compound dissolved in an aqueous solution of ammonium hydroxide and;
  e) mixing solutions (c) and (d) to obtain a final basic solution.

3. The method of claim 2, wherein impregnation is carried out by incipient wetness at room temperature of an alumina support with a specific surface area of 200-250 m$^2$/g, with the first solution drying at 100-120° C. for 3 to 6 hours, ageing the material for 10 to 15 hours, drying at a temperature of 100 to 120° C. for 3 to 5 hours, followed by impregnation of the second solution, ageing of the material for 8 to 10 hours, drying at a temperature of 100 to 120° C. for 4 to 6 hours, and impregnation of the mixture of third and fourth solutions, ageing of the material for 30-40 minutes, and drying at a temperature of 60 to 200° C., during 4 to 15 hours.

4. The method of claim 3, wherein the hydrotreating catalyst contains two metals of group VIB that include Molybdenum or Tungsten, in order to have a metal content between 15% and 25% by weight, a metal of group VIIIB that includes nickel, in order to have a metallic content between 3 and 6% by weight, a phosphorus content of 0.1 to 1.0% by weight and an organic compound that includes an amount of ethylene-diamine tetraacetic acid between 0.10 and 0.70% mol by mol of metals of group VIB and of group VIIIB.

5. The method of claim 4, further comprising:
in a pre-sulfidation stage, loading the catalyst in a fixed bed reactor operating in a continuous flow, then feeding straight run gasoil doped with DMDS until reaching a sulfur content above 2.0% by weight, to a space-velocity (LHSV) of 3 $h^{-1}$, $H_2$ atmosphere, increasing temperature from ambient to 290° C. at a heating rate of 10° C./h, pressure of 56 Kg/cm$^2$, for a time of 15 hours;
in a sulfidation stage, placing the catalyst into contact with straight run gasoil doped with DMDS, under a hydrogen atmosphere, at a space-velocity (LHSV) of 3 $h^{-1}$, pressure of 56 Kg/cm$^2$, the temperature of the bed is increased from 290° C. to 310° C. at a rate of 10° C./h and maintained for 2 h, the temperature is adjusted to 321° C., at a rate of 3° C./h, and these conditions are maintained for a time of 8 hours.

6. The method of claim 5, wherein the resultant catalyst comprises formation of octahedral sites of molybdenum and tungsten, which are dispersed in the porous alumina support and which are not refractory to sulfidation.

7. The method of claim 6, wherein the resultant catalyst comprises structures of NiMoS and NiMoWS after activation or sulfidation.

8. The method of claim 4 wherein the resultant catalyst comprises Mo—W—Ni—P characterized by the formation of MoS$_2$ species.

9. The method of claim 4, further comprising treating a straight run gasoil using a hydrotreatment process with light cyclic oil (LCO/SRGO) using a hydrotreatment process, wherein the straight run gasoil contains between 1.1 and 1.5% by weight of total sulfur and 300 to 400 ppm of total nitrogen.

10. The method of claim 9 wherein the hydrotreating process of straight run gasoil or mixtures of straight run gasoil with light cyclic oil (LCO/SRGO), further comprises:
adjusting the flow of $H_2$, then feeding straight run gasoil or mixtures of straight run gasoil with light cyclic oil (LCO/SRGO) to hydrodesulfurize;
at a flow necessary to have a space-velocity (LHSV) between 0.8-1.5 $h^{-1}$; a pressure between 54-56 Kg/cm$^2$, and $H_2$/HC ratio of 2500 ft$^3$/bbl, increasing the temperature of the catalytic bed from 321° C. to 340° C.;
at a heating rate of 3° C./h, maintaining conditions for a stabilization period of 72 hours;
after said stabilization period, adjusting the temperature up to a temperature required for catalytic activity tests, between 340 and 370° C.; and
at a heating rate 10° C./h, holding each temperature increment stable for 10 hours to obtain diesel with 20 ppm of sulfur at operating conditions of 350° C. and diesel with less than 10 ppm of sulfur at operating conditions from 360 to 370° C.

11. The method of claim 10, wherein the hydrotreatment process of straight run gasoil with a sulfur content of 14,020 ppm is carried out at LHSV of 1.25 $h^{-1}$ and pressure of 54 Kg/cm$^2$, to obtain diesel with 155 and 78 ppm of sulfur at 357 and 368° C., respectively.

12. The method of claim 10, wherein the hydrotreatment process of straight run gasoil with a sulfur content of 14,020 ppm is carried out at LHSV of 1.0 $h^{-1}$ and pressure of 54 Kg/cm$^2$ to obtain a diesel with 136 and 35 ppm of sulfur at 357 and 368° C., respectively.

13. The method of claim 10, wherein the hydrotreatment process of straight run gasoil with a sulfur content of 14,020 ppm is carried out at LHSV at 0.8 $h^{-1}$ and pressure at 54 Kg/cm$^2$ and to obtain a diesel with 86 and 20 ppm of sulfur as a product at 357 and 368° C., respectively.

14. The method of claim 10, wherein the hydrotreating process is carried out using a LCO/SRGO mixture with total sulfur content of 17,000 ppm and 20,000 ppm and total nitrogen content of 300 to 400 ppm; wherein the hydrotreating process is carried out at 368° C. and LHSV of 1.25 $h^{-1}$ and to obtain a diesel with 116 ppm of sulfur.

* * * * *